3,211,744
D-(+)-β-(6-METHOXY-3-INDOLYL)-BUTYRIC
ACID AND METHYL ESTER
Albert Hofmann, Bottmingen, Basel-Land, and Albert Frey, Riehen, Switzerland, assignors to Sandoz Ltd. (also known as Sandoz A.G.), Basel, Switzerland, a Swiss firm
No Drawing. Filed Aug. 30, 1961, Ser. No. 134,847
Claims priority, application Switzerland, Sept. 2, 1960, 9,964/60
2 Claims. (Cl. 260—319)

The present invention relates to optically active indole bases. More particularly, the invention is concerned with compounds having the formula

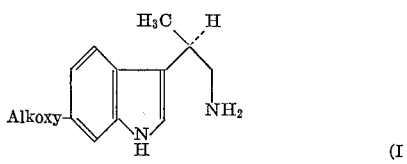

(I)

wherein Alkoxy signifies an alkoxy radical containing from 1 to 4 carbon atoms, their salts with inorganic and organic acids and intermediate compounds obtained by the process of the production of said compounds I. The preparation of the said compounds is effected by a stereospecific synthesis, the starting material being the optically active, naturally occurring D-(+)-pulegone of formula

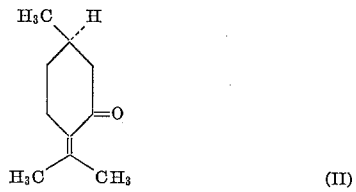

(II)

This monoterpene derivative has a center of asymmetry and, provided the synthesis starting therewith is conducted in a stereospecific manner, i.e. without racemization at the asymmetric carbon atom, the indole bases of the above formula will also be optically active. They therefore have the same absolute configuration as D-(+)-pulegone itself, which is already known and related to that of L-glycerine-aldehyde.

The D-(+)-pulegone is then converted to the alkyl ester of D-(+)-4-methyl-cyclopentane-2-one-carboxylic acid of general Formula III in three steps; the said alkyl ester, which is the actual starting material of the claimed process, is obtained in very good yield and has already been described in the literature. The conversion consists in the permanganate oxidation of pulegone to form D-(+)-β-methyl-adipic acid, esterification of this substituted adipic acid according to known methods and cyclization of the obtained diester according to Dieckmann, e.g. by heating with an alkali metal amide in benzene to form D-(+)-4-methyl-cyclopentane-2-one-carboxylic acid alkyl ester. The above mentioned reactions occur without the configuration of the asymmetrical center of pulegone, of β-methyl-adipic acid, respectively, being affected, i.e. without racemization.

The optically active D-(+)-4-methyl-cyclopentane-2-one-carboxylic acid alkyl ester of Formula III (see formula sheet) is then coupled with the diazonium salt of a 3-alkoxy-aniline. m-Anisidine, m-phenetidine, etc., are suitable coupling components. The process in accordance with the invention is further characterized in that the coupling product is converted by saponification to the optically active alkoxy-phenylhydrazone of D-(+)-2-oxo-4-methyl-adipic acid of Formula IV and the resulting acid esterified in accordance with known methods to form a lower dialkylester of Formula V. By treating with hydrochloric acid in an anhydrous lower alkanol or other reagent generally used in the Fischer synthesis, the diester is transposed without racemization to form the D-(+)-β-(6-alkoxy-2-alkoxycarbonyl-3-indolyl)-butyric acid alkyl ester of Formula VI, and the diester mildly saponified to the corresponding dicarboxylic acid of Formula VII. Compound VII is decarboxylated by being heated alone or in the presence of a high boiling, preferably basic solvent, to form D-(+)-β-(6-alkoxy-3-indolyl)-butyric acid of Formula VIII, the acid converted to a lower alkylester of Formula IX according to the usual methods and the resulting ester converted to D-(+)-β-(6-alkoxy-3-indolyl)-butyric acid-hydrazide of Formula X by boiling with hydrazine hydrate. This hydrazide is treated with sodium nitrite in an acetic acid or inorganic acid medium to form the corresponding azide of Formula XI, which is not isolated as such but directly processed in solution by one of two different methods:

VARIANT A

The azide of Formula XI is nearly quantitatively transposed by heating in an organic acid medium and cyclized to D-(+)-7-alkoxy-1-oxo-4-methyl-1.2.3.4-tetrahydro-β-carboline of Formula XII which is saponified in an alkaline medium to the corresponding amino acid and decarboxylated to form D-(+)-2-(6'-alkoxy-3'-indolyl)-propylamine of Formula I by boiling for a short time in hydrochloric acid.

VARIANT B

The azide of Formula XI is converted to the corresponding benzyl-urethane of Formula XIII by heating in absolute benzylalcohol and compound XIII treated either by catalytic hydrogenation, for example with a 5% palladium catalyst on aluminum oxide, or by acid hydrolysis, to form D-(+)-2-(6'-alkoxy-3'-indolyl)-propylamine of Formula I, which may be isolated as a crystalline derivative, particularly in the form of D-tartrate.

Due to the fact that the D-(+)-2-(6'-alkoxy-3'-indolyl)-propylamines, which have not been described in the literature, were stereospecifically synthesized from the natural D-(+)-pulegone, they are optically pure. The same optically active indole bases may be obtained, on principle, from the racemic compounds, which may be synthesized by known processes, by separating the diastereo-isomeric salts. It has, however, been found that these salts have very similar solubility properties so that a number of fractional crystallizations are necessary for splitting the racemate. This is always accompanied by considerable losses of the compound. Furthermore, the specific rotation, which is the only criterion for a complete separation, is of the order of only a few degrees in all the hitherto known optically active indole bases. The optical purity of the bases obtained by splitting the racemate is thus only ascertained with difficulty, due to the relatively great error of readings in the case of such small rotations. The known process, therefore, is not economical and does not surely yield the desired product.

The optically active compounds I, produced in accordance with the invention, are valuable starting materials in the synthesis of physiologically active compounds, e.g. of the reserpine type. For such synthesis, it is of great significance that the starting materials are optically uniform or that they have a known configuration for, when they are used, e.g. in the synthesis of reserpine compounds, no great losses of valuable products occur as a result of having to separate isomer mixtures. Only now therefore does this synthesis become possible on a commercial scale.

In the following non-limitative example all temperatures are given in degrees centigrade. The melting and boiling points are uncorrected.

In the process of the invention a D-(+)-5-methyl-cyclopentane-2-on-carbonic acid alkyl ester is used as a starting material; said ester may be produced in manner analogous to the following method describing the production of the methyl ester:

(i) *D-(+)-β-methyl-adipic acid*

100 g. of D-(+)-pulegone are suspended in 1 liter of water and cooled to 0–5° while stirring vigorously. A solution of 210 g. of potassium permanganate in 1.4 liters of water at 50–60° are added dropwise at such a rate that the reaction temperature does not rise about 10°. After the entire solution has been added the mixture is kept at room temperature for a further half hour and the reaction mixture then heated to the boil. The unreacted pulegone is distilled off with steam, about 100 cc. of solution being distilled off. The residue remaining in the flask, whilst hot, is filtered through highly purified fuller's earth and the colourless, hot filtrate saturated with sodium chloride. The cooled solution is made acid to Congo red indicator with concentrated hydrochloric acid and extracted with ethyl acetate. The extracts, dried with sodium sulphate, are evaporated and crystalline D-(+)-β-methyl-adipic acid results as a residue. Recrystallisation from ether/petroleum ether yields colourless crystals having a melting point of 80–82°; $[\alpha]_D^{20} = 11°$ (c.=10 in cholorform).

(ii) *D-(+)-β-methyl-adipic acid dimethyl ester*

870 g. of D-(+)-β-methyl-adipic acid are dissolved in 3.25 liters of ethylene chloride and 1.32 liters of methanol and boiled at reflux for 20 hours with vigorous stirring with 32.5 cc. of concentrated sulphuric acid. The reaction mixture is cooled, 600 cc. of saturated sodium chloride solution added, the mixture shaken and separated. The organic phase is washed with a sodium bicarbonate solution and dried over sodium sulphate. After evaporation of the solvent a light brown oil results which distils off at 14 mm. of Hg as a colourless oil. Boiling point 110–115°/14 mm. of Hg; $[\alpha]_D^{20} = +7°$ (c.=11 in chloroform).

(iii) *D-(+)-4-methyl-cyclopentane-2-one-carboxylic acid methyl ester*

480 g. of a 50% sodium amide suspension in xylol are heated to the boil with 4.5 liters of benzene; 750 g. of D-(+)-β-methyl-adipic acid dimethyl ester in 750 cc. of benzene are slowly added dropwise to this solution so that the evolution of ammonia can be kept under control. After the solution has been added the mixture is stirred at the boiling point for a further two hours. The cooled jelly is made acid to Congo red indicator with 1.5 liters of 18% hydrochloric acid whilst cooling and stirring and the organic phase separated from the aqueous layer. Evaporation of the solvent yields a light brown oil which yields D-(+)-4-methyl-cyclopentane-2-one-carboxylic acid methyl ester having a boiling point 100–105°/14 mm. of Hg by vacuum distillation. $[\alpha]_D^{20} = +86°$ (c.=1.0 in chloroform).

EXAMPLE.—D-(+)-2-(6'-METHOXY-3'-INDOLYL)-PROPYLAMINE (a) *m-Methoxy-phenylhydrazone of D-(+)-2-oxo-4-methyl-adipic acid*

360 cc. of m-anisidine are dissolved in 1280 cc. of water and 705 cc. of concentrated hydrochloric acid (36%), cooled to 0° and diazotised at this temperature with a solution of 228 g. of sodium nitrite in 330 cc. of water. The clear diazo solution is added dropwise with vigorous stirring at 0° to an emulsion of 500 g. of D-(+)-4-methyl-cyclopentane-2-one-carboxylic acid methyl ester ($n_D^{22} = 1.4539$; boiling point 100–105°/14 mm. of Hg; $[\alpha]_D^{20} = +86°$, c.=1.0 in chloroform) in 3220 cc. of water containing 840 g. of anhydrous sodium acetate as a buffer and then stirred for a further one and a half hours at 0°. The brown reaction solution is extracted with ether, the ethereal solution dried over sodium sulphate and separated from the solvent in a vacuum. The residue is a brown oil which is boiled at reflux for 3 hours in a ten-fold quantity of aqueous 5% sodium hydroxide solution containing 10% of ethanol. The cooled reaction mixture is extracted once with ether, the aqueous phase separated and brought to a pH value of 7–8 with 18% hydrochloric acid, boiled with 250 g. of activated charcoal and filtered through highly purified fuller's earth. The clear, yellow aqueous solution is made acid to Congo red indicator with hydrochloric acid and exhaustively extracted with ether. After evaporation of the ethereal solution dried over sodium sulphate, a crystalline residue results which is recrystallised from ether/petroleum ether to yield pure m-methoxy-phenylhydrazone of D-(+)-2-oxo-4-methyl-adipic acid. Melting point 136–138°; $[\alpha]_D^{20} = +13°$ (c.=1.5 in ethanol).

(b) *m-Methoxy-phenylhydrazone of D-(+)-2-oxo-4-methyl-adipic acid dimethyl ester*

100 g. of D-(+)-2-oxo-4-methyl-adipic acid m-methoxy-phenylhydrazone are dissolved in 1 liter of ether and esterified with a stream of diazomethane at 0° produced by adding dropwise 230 g. of N-nitroso-p-toluenesulphonic acid methylamide in 1.3 liters of ether to a solution of 53.5 g. of potassium hydroxide in 80 cc. of water containing 270 cc. of ethanol at 65°. After evaporation of the ethereal reaction solution a dimethyl ester results as a yellow oil which yields a light yellow product upon distillation in a high vacuum: Boiling point 185–195°/0.05 mm. of Hg; $[\alpha]_D^{20} = +5°$ (c.=2.1 in ethanol).

(c) *D-(+)-β-(6-methoxy-2-carboxy-3-indolyl)-butyric acid*

300 g. of m-methoxy-phenylhydrazone of D-(+)-2-oxo-4-methyl-adipic acid dimethyl ester are heated to 85–90° for one and a half hours in a pressure vessel in 3 liters of absolute ethanol containing 20% hydrochloric acid. The ammonium chloride is filtered off from the cooled green coloured solution and the solution evaporated in a vacuum. The evaporation residue is diluted with water and extracted with ether, the ethereal solution being washed with water and then with saturated sodium hydrogen carbonate solution. The ethereal solution is dried over sodium sulphate and the ether evaporated in a vacuum, the D-(+)-β-(6-methoxy-2-methoxycarbonyl-3-indolyl)-butyric acid methyl ester resulting as a yellow crude oil which is distilled in a high vacuum. Boiling point 180–200°/0.05 mm. of Hg. A sample of the pure ester crystallises from ether/petroleum ether and has a melting point 112–113°; $[\alpha]_D^{20} = +4.2°$ (c.=10.0 in chloroform).

The resulting crude ester is heated to the boil for 2 hours in a five-fold quantity of 1 N sodium hydroxide in methanol/water (1:1), the solution cooled, separated from the methanol in a vacuum, made acid to Congo red indicator with diluted hydrochloric acid and extracted with ether. After evaporation of the ether an oily crude acid results, from which an acid having a melting point of 188–195° crystallises from ether/petroleum ether. Boiling up once in a ten-fold quantity of ether yields pure D-(+)-β-(methoxy-2-carboxy-3-indolyl)-butyric acid having a melting point of 209–211°; $[\alpha]_D^{20} = +10.4°$ (c.=1.0 in ethanol).

(d) *D-(+)-β-(6-methoxy-3-indolyl)-butyric acid and its methyl ester*

100 g. of D-(+)-β-(6-methoxy-2-carboxy-3-indolyl)-butyric acid are dissolved in 300 cc. of quinaldine and heated together with 54 g. of copper powder to 215–220° for one and a half hours with stirring, decarboxylation occurring. The cooled reaction mixture is filtered, poured onto ice, made acid to Congo red indicator with 505 cc. of 18% hydrochloric acid and extracted with ether. The ether extracts are washed with diluted hydrochloric acid, dried over sodium sulphate and evaporated in a vacuum, D-(+)-β-(6-methoxy-3-indolyl)-butyric acid resulting as a light yellow oil which may be crystallised from ethyl acetate. Melting point 98–99°; $[\alpha]_D^{20}=+16°$ (c.=0.3 in ethanol).

On esterifying directly with diazomethane all the crude acid in the ethereal solution, D-(+)-β-(6-methoxy-3-indolyl)-butyric acid methyl ester having a boiling point 160–170°/0.05 mm. of Hg results. $[\alpha]_D^{20}=+6.5°$ (c.=3.0 in chloroform).

*(e) D-(+)-β-(6-methoxy-3-indolyl)-butyric acid hydrazide*

9.4 g. of D-(+)-β-(6-methoxy-3-indolyl)-butyric acid methyl ester are heated to the boil at reflux for half an hour with a five-fold quantity of hydrazine hydrate. The reaction mixture is then evaporated to dryness in a vacuum, a clear solution in 10 cc. of methanol of the residue is produced and dilution with 100 cc. of water effected, the hydrazide crystallising. After filtration and drying in a high vacuum the D-(+)-β-(6-methoxy-3-indolyl)-butyric acid hydrazide having a melting point of 159–160° results. $[\alpha]_D^{20}=+9.2°$ (c.=1.0 in pyridine).

*(f) D-(+)-2-(6'-methoxy-3'-indolyl)-propylamine*

VARIANT A.—VIA D-(+)-1-OXO-4-METHYL-7-METHOXY-1,2,3,4-TETRAHYDRO-β-CARBOLINE 2.47 g. of D-(+)-β-(6-methoxy-3-indolyl)-butyric acid hydrazide are dissolved in 30 cc. of glacial acetic acid containing 3 cc. of water, the solution cooled to 0° and a solution of 690 mg. of sodium nitrite in 10 cc. of water added dropwise thereto. The yellow azide solution is poured into a boiling solution of 150 cc. of 1 N hydrochloric acid in the course of 3 minutes and boiled at reflux for 5 minutes. The cooled solution is diluted with a twofold quantity of water, extracted with chloroform and the chloroform extracts washed with a saturated sodium bicarbonate solution. After drying over sodium carbonate and evaporating the chloroform a foam results which crystallises in the shape of needles from methanol. The D - (+) - 1-oxo-4-methyl-7-methoxy-1,2,3,4-tetrahydro-β-carboline having a melting point of 171–172° results. $[\alpha]_D^{20}=+16°$ (c.=1.0 in chloroform).

1.860 g. of D-(+)-1-oxo-4-methyl-7-methoxy-1,2,3,4-tetrahydro-β-carboline, 33 cc. of ethanol, 5.8 g. of potassium hydroxide and 21 cc. of water are boiled at reflux for 5 hours. The mixture is then cooled in an ice bath to 0° and 13.8 cc. of concentrated hydrochloric acid carefully added. A crystalline precipitate of D-(+)-2-(6'-methoxy - 2' - carboxy-3'-indolyl)-propylamine having a melting point of 230–232° results; when this material is boiled at reflux for one hour dissolution and decarboxylation occur while 20 cc. of ethanol distil off. The cooled solution is made alkaline with 2 N sodium hydroxide and extracted with chloroform. The chloroform extracts are dried with sodium carbonate and evaporated, a colourless oil resulting. By distillation in a high vacuum D-(+)-2-(6'-methoxy-3'-indolyl)-propylamine results as a viscous, colourless oil having a boiling point 140–150°/0.05 mm. of Hg; $[\alpha]_D^{20}=+11°$ (c.=1.3 in ethanol).

By converting the free base with an equimolar quantity of D-tartaric acid in ethanol, the acid D-tartrate of D-(+) - 2 - (6'-methoxy-3'-indolyl)-propylamine having a melting point of 216–217° is obtained. $[\alpha]_D^{20}=+18°$ (c.=0.5 in water).

VARIANT B.—VIA THE BENZYLURETHANE OF D-(+)-2-(6'-METHOXY-3'-INDOLYL)-PROPYLAMINE 5. g. of D-(+)-β-(6-methoxy-3-indolyl)-butyric acid hydrazide are dissolved in 16 cc. of glacial acetic acid, the solution diluted with 62 cc. of water and covered with a layer of 100 cc. of ether/benzene (1:1). 1.55 g. of sodium nitrite in 15.5 cc. of water are added dropwise with vigorous stirring at 0°. The mixture is stirred further and after 5 minutes the organic phase is separated and washed with sodium bicarbonate and water. The yellow ethereal-benzene solution of D-(+)-β-(6-methoxy-3-indolyl)-butyric acid azide is dried over sodium sulphate and concentrated to about 60 cc. in a vacuum at a water bath temperature of 20–30°. This solution is added dropwise to 20 cc. of absolute benzyl alcohol which is heated to 135°; the reaction mixture is heated for half an hour. The cooled solution is separated from the excess benzyl alcohol, the oily residue dissolved in 50

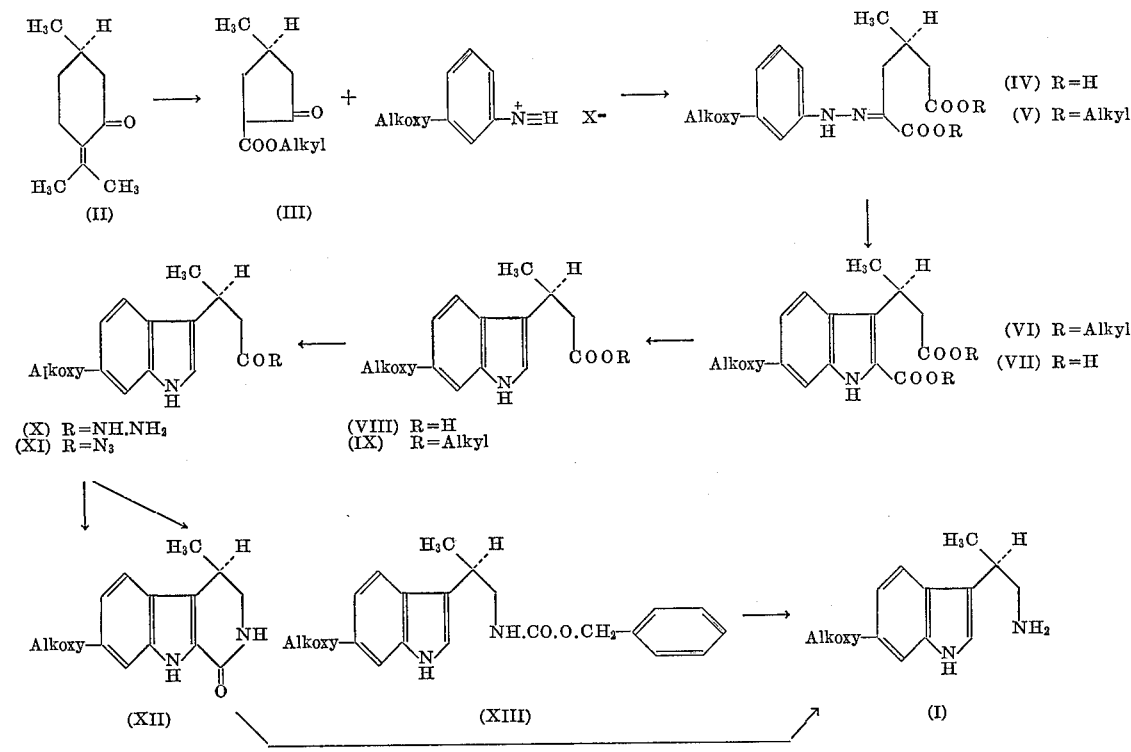

cc. of absolute chloroform and filtered through 10 g. of aluminium oxide. By evaporating the chloroform in a vacuum the benzylurethane of D-(+)-2-(6'-methoxy-3'-indolyl)-propylamine results as a colourless oil.

This benzylurethane is dissolved in 50 cc. of methanol/glacial acetic acid (1:1) and hydrogenated with 5 g. of 5% palladium catalyst on aluminium oxide during the course of 20 hours at room temperature and normal pressure; approximately 420 cc. of hydrogen are used. The catalyst is filtered off from the hydrogenation solution, which solution is freed from the solvent in a vacuum and the residue taken up in water/chloroform. After making alkaline with a 2 N sodium hydroxide solution, the mixture is extracted a number of times with chloroform, the chloroform extract dried over sodium carbonate and evaporated to dryness. A colourless oil results which upon addition of the calculated quantity of D-tartaric acid in a little ethanol yields the D-tartrate of D-(+)-2-(6'-methoxy-3'-indolyl)-propylamine. Melting point 216–217°; $[\alpha]_D^{20}=+18°$ (c.=0.5 in water).

Having thus disclosed the invention, what we claim is:

1. A compound selected from the group consisting of optically pure D-(+)-β-(6-methoxy-3-indolyl)-butyric acid, $[\alpha]_D^{20}=+16°$ (c. =0.3 in ethanol), and the methyl ester thereof.

2. Optically pure D-(+)-β-(6-methoxy-3-indolyl)-butyric acid, $[\alpha]_D^{20}=+16°$ (c.=0.3 in ethanol).

References Cited by the Examiner

UNITED STATES PATENTS

| | | | |
|---|---|---|---|
| 2,416,258 | 2/47 | Jenkins et al. | 260—319 |
| 2,944,064 | 7/60 | Justoni et al. | 260—319 |
| 3,028,395 | 4/62 | Gillingham | 260—319 |
| 3,048,592 | 8/62 | Muller et al. | 260—236 |
| 3,051,723 | 8/62 | Fritz | 260—319 |

OTHER REFERENCES

Fieser et al.: Advanced Organic Chemistry, Reinhold Publishing Corp., New York, 1961, page 119.

Jackson et al.: J. American Chem. Soc., Vol. 52, pp. 5029–5035 (1930).

NICHOLAS S. RIZZO, *Primary Examiner.*

IRVING MARCUS, JOHN D. RANDOLPH, *Examiners.*